(No Model.)
H. F. DALTON.
MERCHANDISE HAND HOOK.
No. 555,681. Patented Mar. 3, 1896.
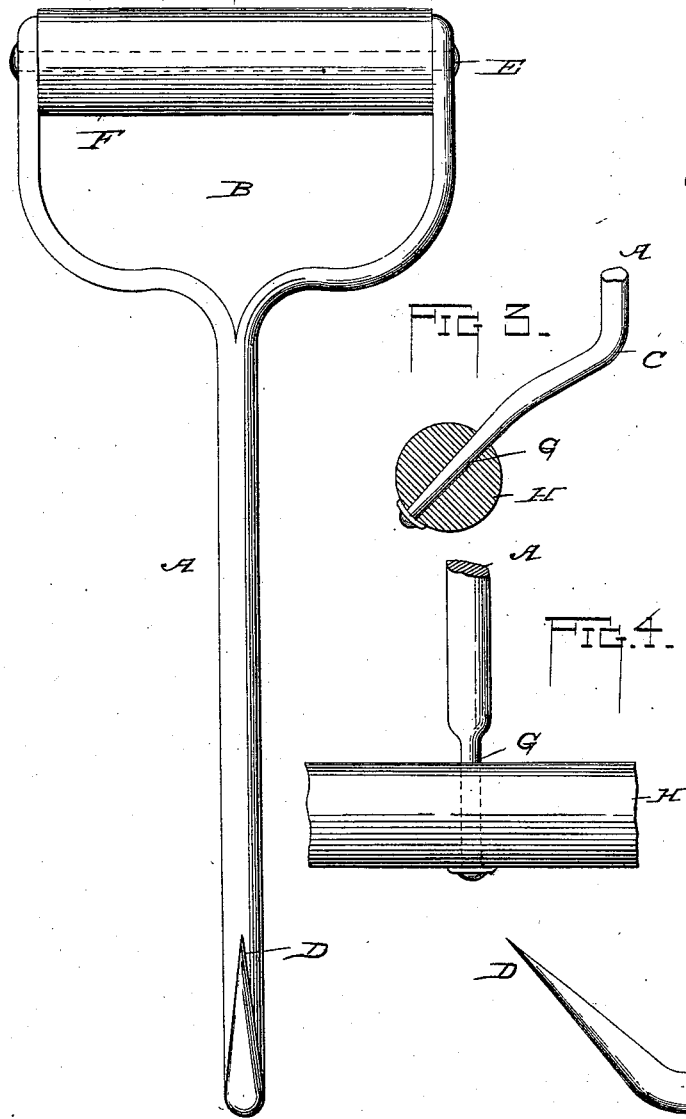
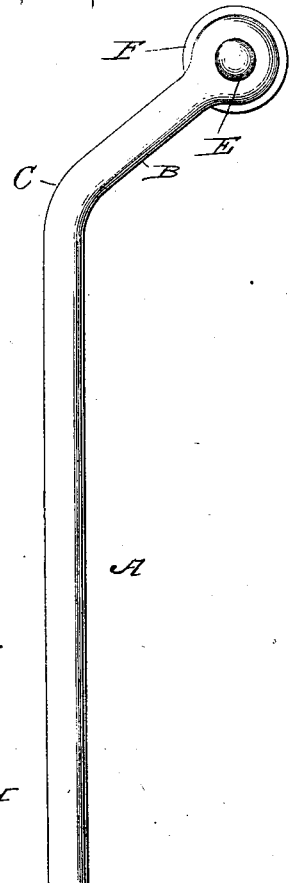
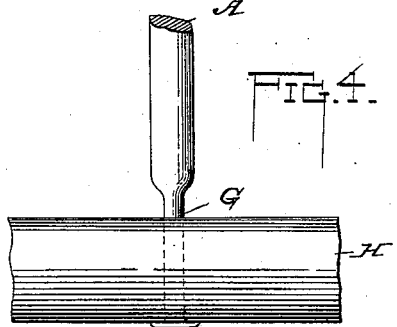
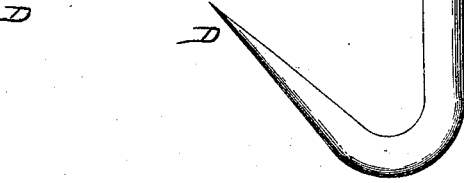
WITNESSES
Henry F. Dalton
INVENTOR
Attorney

UNITED STATES PATENT OFFICE.

HENRY FRANCIS DALTON, OF AZUSA, CALIFORNIA.

MERCHANDISE HAND-HOOK.

SPECIFICATION forming part of Letters Patent No. 555,681, dated March 3, 1896.

Application filed March 19, 1895. Serial No. 542,328. (No model.)

*To all whom it may concern:*

Be it known that I, HENRY FRANCIS DALTON, a citizen of the United States, residing at Azusa, in the county of Los Angeles and State of California, have invented certain new and useful Improvements in Merchandise Hand-Hooks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in merchandise hand-hooks—that is to say, a hook specially constructed and adapted for handling or moving merchandise, such as boxes, packages, bales, or in fact any bulky or heavy weight—and the main object of my invention is the provision of a hook which will not permit of the hand coming in contact with the article to be moved and thereby avoid bruising, cutting or tearing the flesh, which is a serious objection.

Another object of my invention is the provision of a hook which will act after the manner of a lever of the first class, enabling a great amount of weight to be moved with very little exertion and without danger to the person.

A further object of my invention is the provision of a hook which will be very cheap and durable, easy to use and thoroughly efficient and practical.

To attain the desired objects the invention consists of a hand-hook embodying novel features of construction and arrangement of parts for service, as will appear.

Figure 1 is a front elevation of my hook, and Fig. 2 is an edge or side view thereof. Figs. 3 and 4 are detail views of a modified form of handle connection. Fig. 5 represents a detail view of my hook as seen in use.

My improved hook is of very simple construction and is made from a single piece of material to provide the shank A having the bifurcation or fork B at one end, which fork is arranged at an angle to the body of the shank, which angle or bend forms the bearing or fulcrum C, which rests on the surface of the box, and at the other end the shank is formed with the hook D arranged at a sharp or acute angle to the body of the shank and thus insuring the hook properly entering the box or other article and giving a firm hold therein. In the fork of the shank is mounted the pin or rod E, on which is placed the grasping portion or handle F.

In the modified form the end of the shank is formed with the reduced portion G, which fits the handle H, and by thus reducing the shank it is impossible for the handle to work loose or become detached, and this is of vital importance, as much strain is brought directly on the handle.

From the drawings and description it will be seen that very heavy weights can be moved by my hook and that it is impossible for the hand to be injured, and further that the handle is made very secure.

I claim—

The hand-hook herein shown and described consisting of a single piece of metal having one end formed with a hook at an acute angle to the body or main portion, having the body or main portion arranged in a horizontal plane and adapted to rest flat upon the face of a box or surface, and having the other end arranged at an angle to the body and carrying the handle.

In testimony whereof I affix my signature in presence of two witnesses.

HENRY FRANCIS DALTON.

Witnesses:
J. A. METCALFE,
E. F. TAYLOR.